June 3, 1924. 1,496,340
W. B. KOCHENDERFER
VALVE MECHANISM
Filed Nov. 23, 1921 2 Sheets-Sheet 1

Witness:
Walter Chism.

Inventor:
William B. Kochenderfer.
by Murray C. Boyer
Attorney.

June 3, 1924.

W. B. KOCHENDERFER

VALVE MECHANISM

Filed Nov. 23, 1921

Witness:
Walter Chim

Inventor:
William B. Kochenderfer
by
Murray C. Boyer
Attorney.

Patented June 3, 1924.

1,496,340

UNITED STATES PATENT OFFICE.

WILLIAM B. KOCHENDERFER, OF CAMDEN, NEW JERSEY.

VALVE MECHANISM.

Application filed November 23, 1921. Serial No. 517,357.

*To all whom it may concern:*

Be it known that I, WILLIAM B. KOCHEN-DERFER, a citizen of the United States, and a resident of Camden, Camden County, New Jersey, have invented certain new and useful Improvements in Valve Mechanism, of which the following is a specification.

My invention relates to the hydraulic valve mechanism of hydraulic elevators and the improvements forming the subject of my invention are directed more particularly to the structure of the pilot valve controlling the admission of fluid pressure for effecting the operation of the elevator mechanism during ascent or descent of the elevator.

One object of my invention is to provide a detachable pilot valve structure.

A further object of my invention is to provide a special support or mounting for the detachable pilot valve structure whereby repairs or renewals can be easily and expeditiously made without affecting the other parts of the mechanism.

A further object of my invention is to provide means for supporting the pilot valve casing independently of the rest of the structure.

And a still further object of my invention is to provide means whereby the passage of fluid through the pilot valve can be readily controlled.

These and other features of my invention are more fully set forth hereinafter, reference being had to the accompanying drawings, in which:

Figs. 3 and 4, are sectional plan views on the lines III—III and IV—IV, Fig. 1, illustrating details of my invention.

Figure 1:
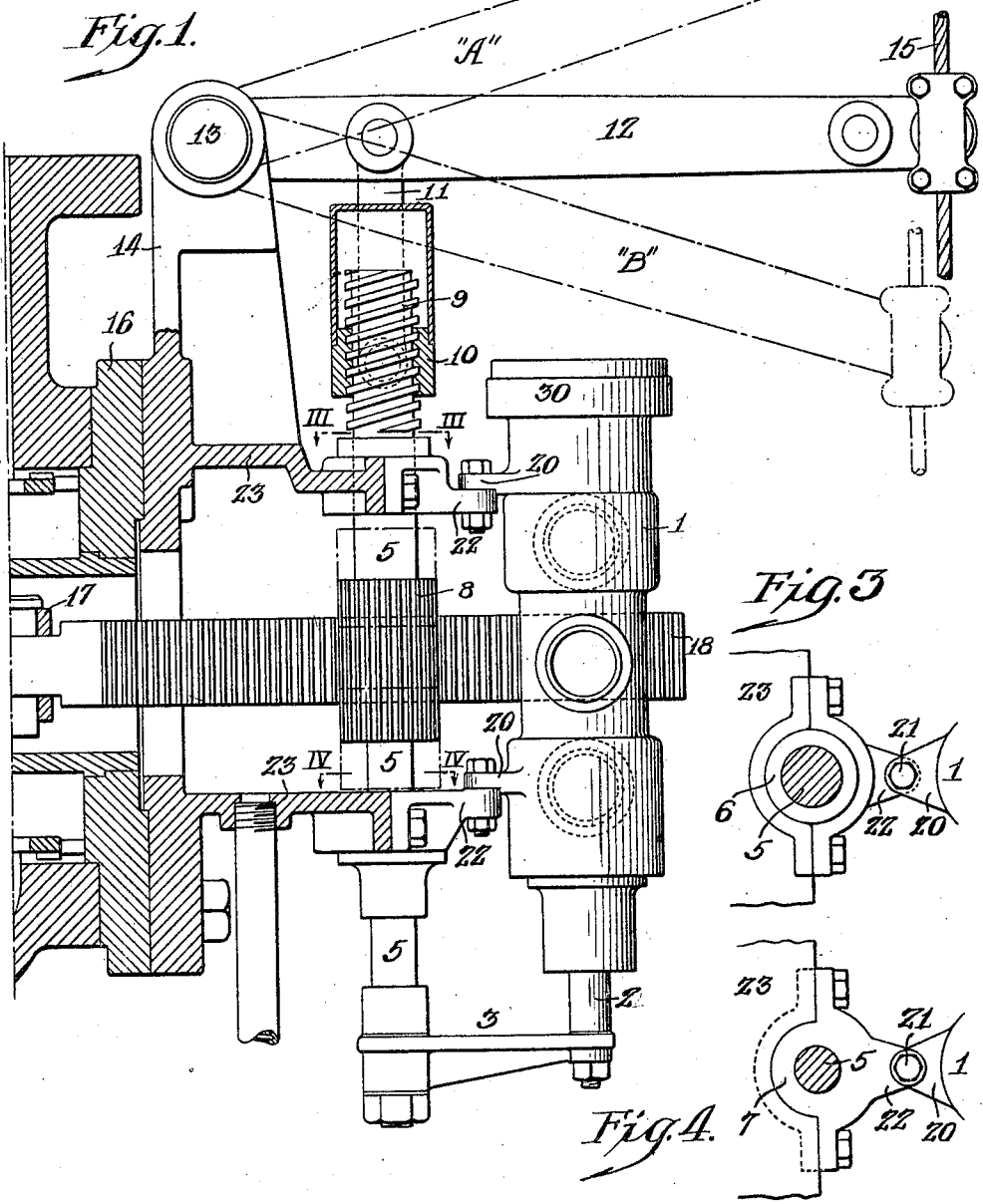
Figure 1, is an elevation, partly in section, of sufficient of the hydraulic valve mechanism of an hydraulic elevator structure to illustrate my invention.
Figure 2:
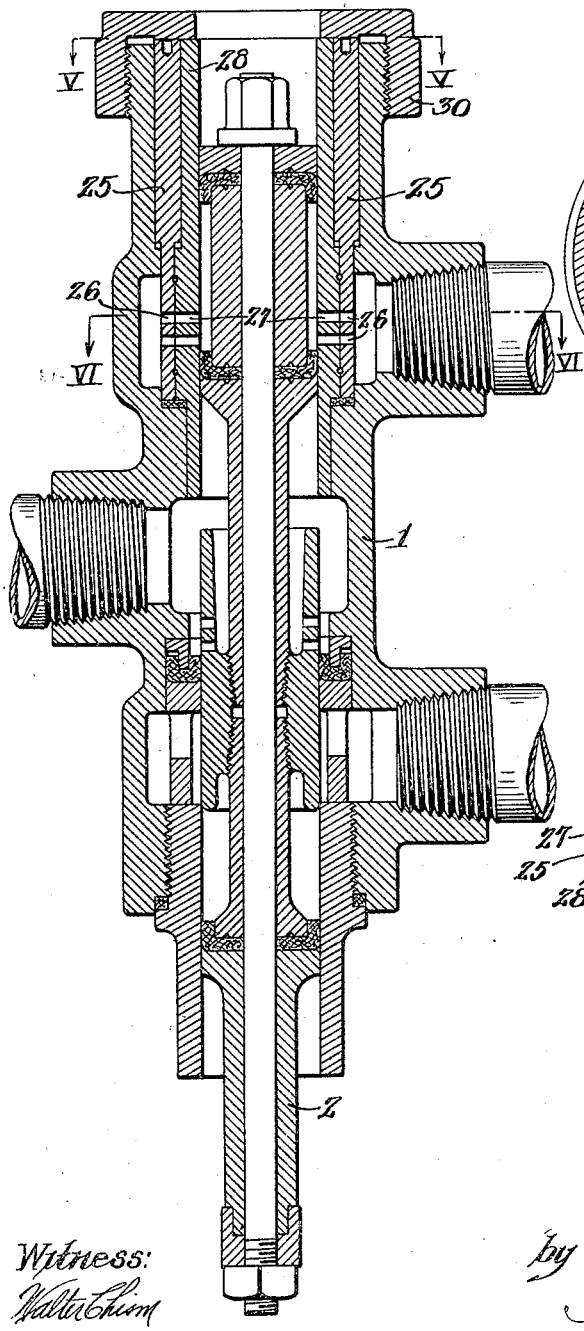
Fig. 2, is a vertical sectional view of the pilot valve on a slightly larger scale.
Figure 5:
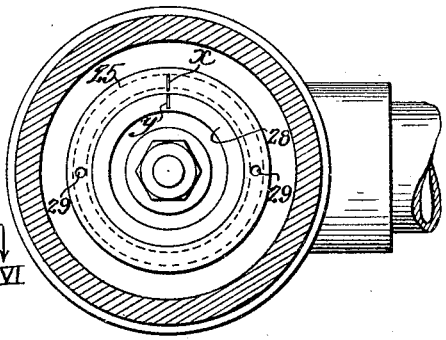
Figs. 5 and 6, are sectional plan views on the lines V—V and VI—VI, Fig. 2, illustrating other details of my invention.
Figure 6:
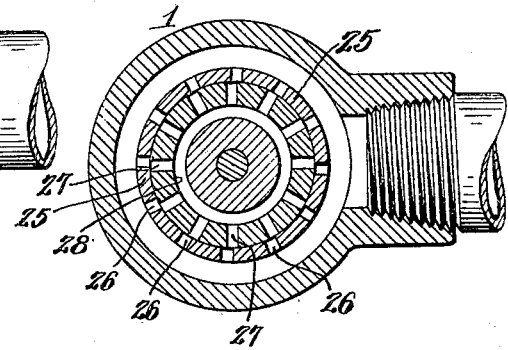

In the drawings, which illustrate sufficient of the valve mechanism of an hydraulic elevator system with which the structure forming the subject of my invention is associated, 1 represents the casing of a pilot valve structure, 2 the stem of the pilot valve, and 3, a bracket arm whereby said stem may be connected to an operating member. This operating member may comprise a vertically disposed shaft or spindle 5, slidably mounted in bearings 6 and 7, suitably supported; which shaft or spindle carries a pinion 8, and a threaded portion 9, adapted to a cap nut 10.

The cap nut is hung by links 11, from a lever 12, pivoted at 13, to a bracket 14, which lever is connected at its outer end to the operating table 15, such operating table being the element to which vertical movement must be imparted, in one direction or the other, when it is desired to so operate the pilot valve that fluid pressure will be properly directed thereby to the valved operating mechanism for effecting movement of the elevator in the desired direction.

The bracket 14, forming the pivotal support for the lever 12, may be carried at the end of a casing 16, containing one of the valves (not shown) to which movement is imparted by the pressure controlled by and passing through the pilot valve, and this valve is provided with a stem 17, having at its outer end, adjacent to said pilot valve, a racked portion 18, in engagement with the pinion 8. The pinion 8 is of the broad-faced type so that it may be in operative engagement with such racked portion 18 at all times, no matter what the vertical position of such pinion with respect to said rack portion may be.

These several parts, which constitute the controlling means of hydraulic elevator systems, are normally in the position illustrated in full lines, Fig. 1.

When it is desired to start the elevator, in an upward direction for instance, the cable 15 is raised until the lever 12 has been moved to the position "A," indicated by dotted lines, Fig. 1. As may be understood, this raising of the lever carries up the cap nut 10 and with it the shaft 5 in its bearings, and the pilot valve whose stem is connected to the shaft 5, and the pinion 8 is moved across the face of the rack rod.

Such action having admitted liquid to the valve controlling the stem 17 to which the rack rod 18 is attached, such rack rod will be moved and being in engagement with the pinion, will turn the latter which, transmitting its movement to its shaft 5, turns the threaded portion 9 of the latter in the cap nut 10 and restores the pilot valve to the normal or mid position.

This action, of course, has changed the position of the threaded portion 9 of the shaft 5 with respect to the cap nut 10. When, however, the upward movement of the car is to be arrested, the cable is lowered by the usual means on the car to bring the lever 12 to the mid position, indicated by full lines, Fig. 1, and additionally lowering the nut and the threaded portion 9 of the shaft 5 connected to the same together with the pinion 8, which is lowered with respect to the rack rod, and with these parts the pilot valve.

The pilot valve being lowered by this action, liquid will be introduced to the opposite side of the valve to which the stem 17 carrying the rack rod 18 is connected, and exhausted from the chamber which had previously received the liquid serving to move said rack rod 18 toward the right, and will effect movement of the latter toward the left, and by its engagement with the pinion 8 carried by the shaft or spindle 5 said threaded portion 9 of the latter will be again turned with respect to the cap nut 10, and will be restored to the position indicated by full lines in Fig. 1.

The same conditions occur when the elevator is descending; the cable being actuated to lower the lever 12 to position "B" when descent is intended, and the pilot valve being restored to the mid position by the rack rod moving the pinion. When the car is to be stopped on a descending movement, the cable is actuated to raise the lever 12 to the position indicated by full lines, Fig. 1; lifting with it the pilot valve.

As soon as the valve mechanism controlling the means effecting stoppage of the descending elevator is in action, the rack rod 18, of the stem 17, will be moved in the opposite direction, and turning the pinion 8, and the shaft or spindle 5, carrying the same, will again restore the pilot valve to the normal or mid position.

It will thus be seen that the lever 12 must always be in the horizontal position before movement of the elevator can be effected through the operation of the pilot valve, which must always be in the mid-position, ready for operation in either direction, depending upon whether the elevator is in motion or at rest. That is to say, the lever and cable occupy the position indicated by full lines in Fig. 1, when at rest, and they are restored to such position so as to occupy it when the car is in motion, whether the elevator is moving up or down. The foregoing is merely descriptive of the structure to which the improvements forming the subject of my invention have been applied.

As may be readily understood, constant operation of the pilot valve occasions considerable wear, and it is necessary that this valve be maintained in the highest condition of efficiency in order that the apparatus may work properly. Under former conditions, the pilot valve having been associated directly with the other parts of the mechanism, it has been necessary to dismantle the lever; the shaft or spindle carrying the broadfaced pinion, and the cap nut, and then to reset this mechanism in the position formerly occupied.

In the arrangement of the pilot valve structure according to my invention, the pilot valve casing 1, is provided with brackets 20, which may be connected by bolts 21, to brackets 22, carried by the supporting member indicated at 23, carrying the bracket 14. The shaft or spindle 5, carrying the pinion 8, is movably mounted in the bearings 6 and 7 carried by said supporting member 23. In the use of my invention, therefore, I obviate all of the difficulty usually accompanying the replacement or repair of the pilot valve by providing a structure which may be detached from the other parts; the casing of said pilot valve being provided with the brackets 20, detachably connected to the brackets 22, carried by the supporting member 23.

In this arrangement, therefore, after disconnecting the pipes which enter the pilot valve casing, it is only necessary to remove the bolts 21, connecting the brackets 20 and 22, and to detach the arm 3, from the valve stem 2. After a new pilot valve and casing has been set in place, it is only necessary to reconnect the brackets 20 and 22 and the arm 3; the required change occupying but a few minutes of time and without altering or disarranging any portion of the valved operating mechanism which effects movement of the elevator and which may be directly connected with or controlled by the pilot valve.

It may be desirable under some circumstances to be able to control the fluid pressure passing through the pilot valve. For this purpose, one end of the latter may be provided with a sleeve 25, apertured at 26, in line with apertures 27 of an inner bushing 28, of the pilot valve structure, which bushing is normally held in a fixed position, and this sleeve is so arranged as to be capable of rotative movement with respect to such bushing.

The end of the sleeve may have recesses 29, for the reception of the prongs of a spanner wrench or similar tool, whereby the sleeve may be turned. By properly spacing the apertures of the sleeve and bushing with relation to each other, the openings or passages provided by the same when in registry may be cut down by partially rotating said sleeve 25, with respect to the bushing.

The end of the sleeve and bushing will preferably be provided with suitable indicating marks, $x$ and $y$, respectively, so as to guide the operator when turning said sleeve with respect to the bushing. The end of the sleeve is preferably enclosed by means of a cap 30, threaded onto the end of the valve casing 1, so that whenever the sleeve 25 is set, it can be held in its adjusted position.

I claim:

1. In hydraulic valve mechanism for elevator systems, a pilot-valve arranged to move in parallelism with a pinion-carrying rod whose pinion is in operative engagement with a racked portion of the main valve stem, a lever, a support therefor, a cable for actuating said lever; said pilot-valve being operated by said lever through the pinion-carrying rod, and a casing for said pilot-valve detachably connected to the means supporting said pinion-carrying rod.

2. In hydraulic valve mechanism for elevator systems, a pilot valve arranged to move in parallelism with a pinion-carrying rod whose pinion is in operative engagement with a racked portion of the main valve stem, a lever, a support therefor, a cable for actuating said lever; said pilot-valve being operated by said lever through the pinion carrying rod, a casing for said pilot-valve, and means for detachably connecting the casing of said pilot-valve to the means supporting said pinion-carrying rod.

3. In hydraulic valve mechanism for elevator systems, a lever, a support therefor, a cable for actuating said lever, a pilot valve operated by said lever, and brackets carried by the casing of said pilot valve for detachably connecting the same to the lever support.

4. In valve mechanism for hydraulic elevator systems, a lever, a support therefor, a cable for actuating said lever, a shaft operated by said lever, a pilot valve operatively connected to said shaft and actuated thereby, bearings for said shaft carried by the lever support and brackets carried by the casing of said pilot valve for detachably connecting the same to said bearings.

In witness whereof I have signed this specification.

WILLIAM B. KOCHENDERFER.